US010061020B2

(12) United States Patent
Slobodyanyuk et al.

(10) Patent No.: US 10,061,020 B2
(45) Date of Patent: Aug. 28, 2018

(54) LIGHT DETECTION AND RANGING (LIDAR) SYSTEM WITH DUAL BEAM STEERING

(71) Applicant: QUALCOMM Incorporated, San Diego, CA (US)

(72) Inventors: Volodimir Slobodyanyuk, San Diego, CA (US); Evgeni Petrovich Gousev, Saratoga, CA (US); Karim Arabi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 14/859,341

(22) Filed: Sep. 20, 2015

(65) Prior Publication Data

US 2017/0082735 A1 Mar. 23, 2017

(51) Int. Cl.

| | |
|---|---|
| ***G01S 7/481*** | (2006.01) |
| ***G01S 17/42*** | (2006.01) |
| ***G01S 17/87*** | (2006.01) |
| ***G01S 17/93*** | (2006.01) |

(52) U.S. Cl.

CPC ............ *G01S 7/4817* (2013.01); *G01S 17/42* (2013.01); *G01S 17/936* (2013.01); *G01S 17/87* (2013.01)

(58) Field of Classification Search

CPC ...... G01S 7/4817; G01S 7/4815; G01S 17/42; G01S 17/87; G01S 17/936

See application file for complete search history.

(56) References Cited

U.S. PATENT DOCUMENTS

| | | | | |
|---|---|---|---|---|
| 5,638,164 | A | 6/1997 | Landau | |
| 6,008,925 | A * | 12/1999 | Conemac | G02B 26/122 359/204.1 |
| 6,473,241 | B1 | 10/2002 | Wick et al. | |
| 8,818,609 | B1 | 8/2014 | Boyko et al. | |
| 9,019,612 | B2 | 4/2015 | Wagener | |
| 2004/0240754 | A1* | 12/2004 | Smith | G01B 11/00 382/286 |
| 2007/0219720 | A1 | 9/2007 | Trepagnier et al. | |
| 2007/0272841 | A1* | 11/2007 | Wiklof | G01S 7/4817 250/234 |
| 2009/0195790 | A1* | 8/2009 | Zhu | G01B 11/24 356/612 |
| 2009/0303099 | A1* | 12/2009 | Weilkes | G01S 7/483 342/27 |
| 2010/0328644 | A1 | 12/2010 | Lu et al. | |

(Continued)

FOREIGN PATENT DOCUMENTS

| | | |
|---|---|---|
| WO | 2014014838 A2 | 1/2014 |
| WO | 2016153687 A1 | 9/2016 |

OTHER PUBLICATIONS

International Search Report and Written Opinion—PCT/US2016/051859—ISA/EPO—dated Aug. 7, 2017.

*Primary Examiner* — Eric L Bolda

(74) *Attorney, Agent, or Firm* — MG-IP Law, P.C

(57) ABSTRACT

A light detection and ranging (LIDAR) apparatus includes dual beam scanners with dual beam steering. A first beam scanner in the LIDAR apparatus scans a wider area in one or more of a first plurality of scan patterns, and a second beam scanner in the LIDAR apparatus scans a narrower area in one or more of a second plurality of scan patterns different from the first plurality of scan patterns.

30 Claims, 4 Drawing Sheets

(56) References Cited

U.S. PATENT DOCUMENTS

| | | | | |
|---|---|---|---|---|
| 2012/0075686 | A1* | 3/2012 | Hudman | G02B 3/0006 359/205.1 |
| 2013/0016178 | A1* | 1/2013 | Birkbeck | H04N 5/2254 348/36 |
| 2013/0182239 | A1 | 7/2013 | Kaiser | |
| 2014/0063189 | A1* | 3/2014 | Zheleznyak | G01S 17/89 348/46 |
| 2014/0240810 | A1 | 8/2014 | Sapir | |
| 2015/0009485 | A1* | 1/2015 | Mheen | G01S 17/87 356/4.01 |

* cited by examiner

LIGHT DETECTION AND RANGING (LIDAR) SYSTEM WITH DUAL BEAM STEERING

FIELD OF DISCLOSURE

Various embodiments described herein relate to light detection and ranging (LIDAR), and more particularly, to dual beam steering in LIDAR.

BACKGROUND

LIDARs have been used in various applications for detecting stationary and moving objects. For example, LIDARs are increasingly being implemented in vehicle collision avoidance systems to detect stationary and moving vehicles to avoid traffic collisions. In a conventional LIDAR system, detection of objects is achieved by scanning a laser beam in a predetermined scan pattern. For example, a laser beam in a conventional LIDAR system may be redirected by reflecting the laser beam from a moving or rotating mirror. The moving or rotating mirror may be mechanically controlled, for example, by a micro-electro-mechanical system (MEMS). Such mechanical or MEMS controlled mirrors are capable of scanning the laser beam in predetermined patterns but are typically not capable of foveation, that is, pointing the beam in random directions, or pointing the beam to different spots at different times not based on a predetermined scan pattern. Diffraction-based liquid-crystal-on-silicon (LCOS) beam steering may be capable of foveation, but the switching rates of typical LCOS systems are relatively low.

In typical highway traffic, two vehicles traveling in opposite directions may approach each other at a high relative velocity. If one of the vehicles is equipped with a conventional LIDAR system with a relatively low rate of scan, the two vehicles may have traveled a significant distance toward each other between two consecutive scans. On the other hand, if laser beam scanning is limited to a narrow sector in an attempt to improve the rate of scan, then vehicles outside that sector may not be detected. In order to provide effective vehicle detection and collision avoidance, it is desirable that vehicles be equipped with LIDAR systems that are capable of both scanning wide areas in which objects of interest may be found and providing fast updates on objects of interest within those areas, for example, fast-approaching vehicles.

SUMMARY

Exemplary embodiments of the disclosure are directed to apparatus and methods for dual or multiple beam steering in light detection and ranging (LIDAR) systems.

In an embodiment, a LIDAR apparatus is provided, the LIDAR apparatus comprising: a first beam scanner configured to scan in one or more of a first plurality of scan patterns; and a second beam scanner configured to scan in one or more of a second plurality of scan patterns different from said one or more of the first plurality of scan patterns; and a controller coupled to the first beam scanner and the second beam scanner, the controller configured to drive the first beam scanner based on one or more areas of interest in which one or more targets are likely located and to drive the second beam scanner to monitor one or more identified targets in said one or more areas of interest.

In another embodiment, a LIDAR apparatus is provided, the LIDAR apparatus comprising: first means for scanning one or more laser beams in one or more of a first plurality of scan patterns; and second means for scanning one or more laser beams in one or more of a second plurality of scan patterns different from said one or more of the first plurality of scan patterns; and means for controlling the first means for scanning and the second means for scanning, comprising: means for driving the first beam scanner based on one or more areas of interest in which one or more targets are likely located; and means for driving the second beam scanner to monitor one or more identified targets in said one or more areas of interest.

In another embodiment, a method of scanning one or more laser beams is provided, the method comprising: scanning one or more laser beams in one or more of a first plurality of scan patterns based on one or more areas of interest in which one or more targets are likely located; and scanning one or more laser beams in one or more of a second plurality of scan patterns different from said one or more of the first plurality of scan patterns to monitor one or more identified targets in said one or more areas of interest.

In yet another embodiment, an apparatus for scanning one or more laser beams is provided, the apparatus comprising: logic configured to scan one or more laser beams in one or more of a first plurality of scan patterns based on one or more areas of interest in which one or more targets are likely located; and logic configured to scan one or more laser beams in one or more of a second plurality of scan patterns different from said one or more of the first plurality of scan patterns to monitor one or more identified targets in said one or more areas of interest.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
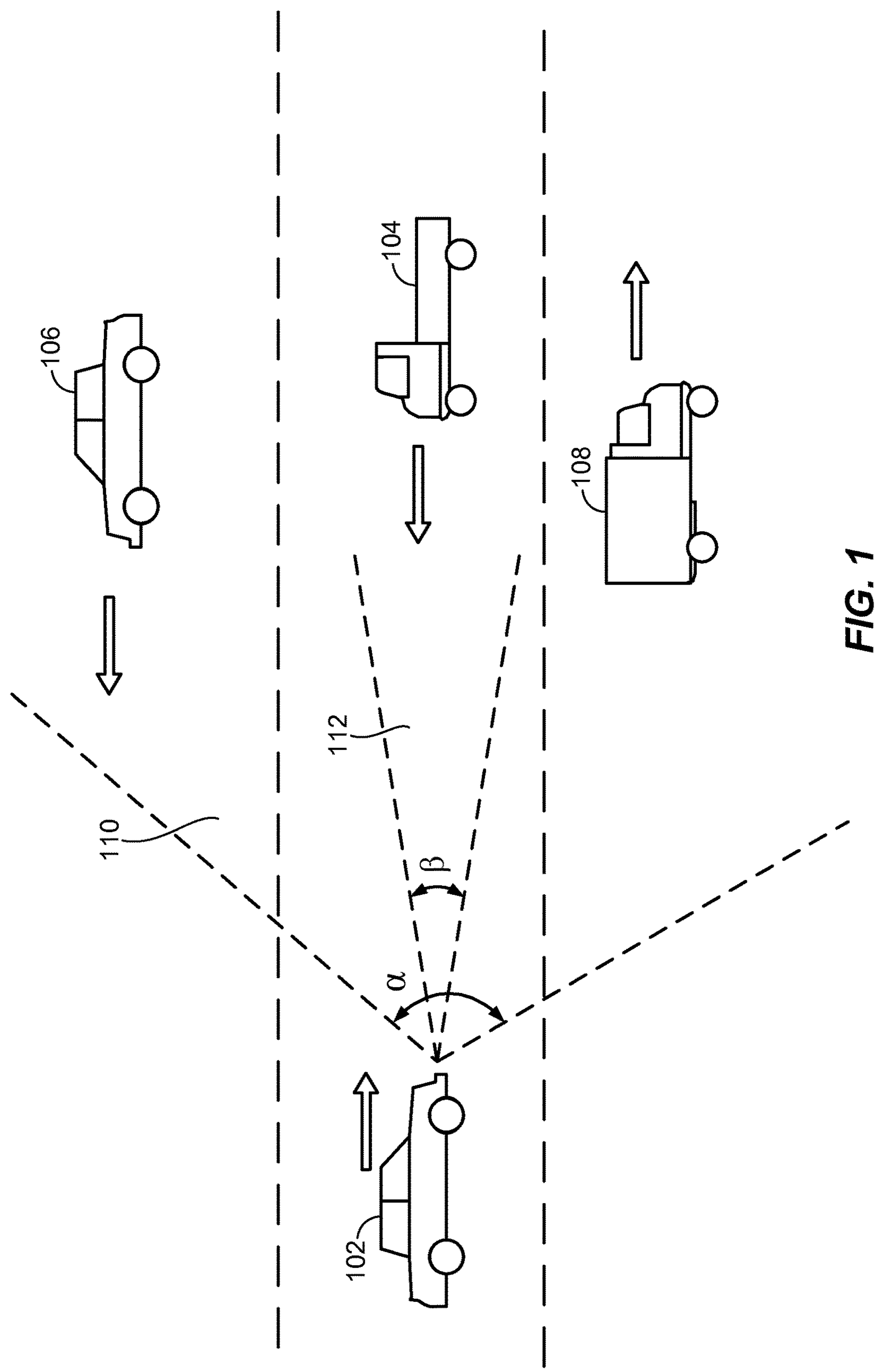
FIG. 1 is a diagram illustrating an example of a traffic environment in which a light detection and ranging (LIDAR) apparatus may be implemented in a vehicle for collision avoidance.

Aspects of the disclosure are described in the following description and related drawings directed to specific embodiments. Alternate embodiments may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of the embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, and/or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many embodiments are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

FIG. 1 is a diagram illustrating an example of a traffic environment in which one or more vehicles may be equipped with light detection and ranging (LIDAR) apparatus for collision avoidance. In the example illustrated in FIG. 1, a first vehicle 102 drives on the same road as second, third and fourth vehicles 104, 106 and 108. The second and third vehicles 104 and 106 move in a direction opposite that of the first vehicle 102, whereas the fourth vehicle 108 moves in the same direction as the first vehicle 102.

The fourth vehicle 108 may not present an immediate safety concern to the first vehicle 102 because it travels in a different lane and moves in the same direction as the first vehicle 102. Although the third vehicle 106 moves in the direction facing the first vehicle 102, it travels in a different lane and may not present an immediate safety threat to the first vehicle 102. The second vehicle 104, however, may present a more immediate safety threat to the first vehicle 102 because it travels in the same lane as the first vehicle 102 and moves in a direction approaching the first vehicle 102.

In the example illustrated in FIG. 1, the first vehicle 102 is equipped with a light detection and ranging (LIDAR) apparatus, embodiments of which will be described in further detail below with reference to FIGS. 2-4. In FIG. 1, the LIDAR apparatus in the first vehicle 102 is able to scan a relatively wide sector indicated by angle $\alpha$, covering an area 110 that includes the positions of the third and fourth vehicles 106 and 108 in the example illustrated in FIG. 1. Although the third and fourth vehicles 106 and 108 in the example illustrated in FIG. 1 may not present immediate threats to the safety of the first vehicle 102, they may change directions and swerve into the lane in which the first vehicle 102 is traveling, for example.

Furthermore, the LIDAR apparatus in the first vehicle 102 is also capable of tracking or providing fast updates of objects that may present more immediate safety concerns to the first vehicle 102, for example, the second vehicle 104 traveling in the same lane as and in the direction facing the first vehicle 102, in the example illustrated in FIG. 1. In an embodiment, the LIDAR apparatus in the first vehicle 102 is capable of fast beam scanning within a sector indicated by angle $\beta$, covering an area 112 smaller than the area 110, to provide fast updates on the distance or velocity of the second vehicle 104 within the area 112.

Figure 2:
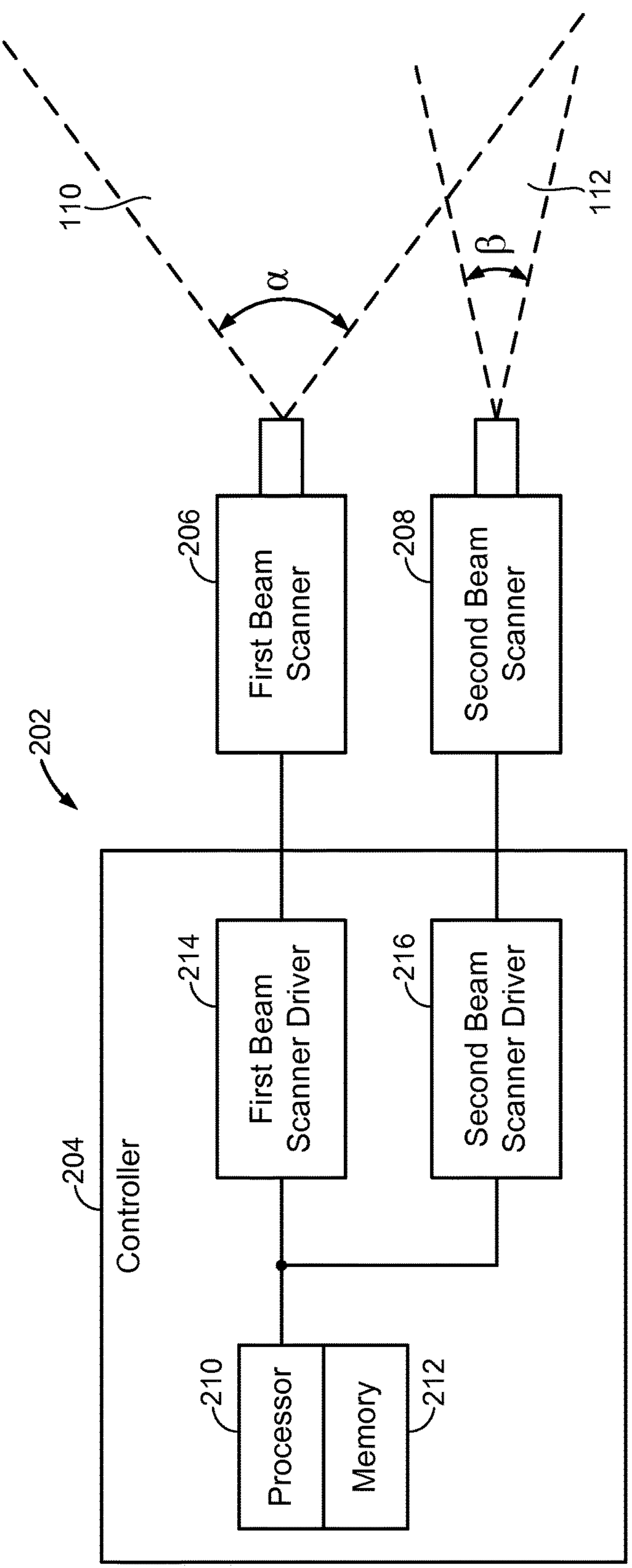
FIG. 2 is a block diagram illustrating an embodiment of a LIDAR apparatus with dual beam steering.

FIG. 2 is a block diagram illustrating an embodiment of a LIDAR apparatus 202 which may be implemented in the first vehicle 102 for vehicle detection and collision avoidance. The LIDAR apparatus 202 as illustrated in FIG. 2 is not limited to automobile applications as illustrated in FIG. 1. For example, the LIDAR apparatus 202 may be implemented in a tracked vehicle, a train, a watercraft, or an aircraft for collision avoidance. The LIDAR apparatus 202 may also be implemented in a portable device carried by a pedestrian, or installed on a bicycle, a scooter, or a motorcycle, for example. Moreover, it is not necessary that the LIDAR apparatus 202 be implemented in a moving object. For example, the LIDAR apparatus 202 may be installed at a stationary location to monitor traffic patterns or to provide warnings.

In the embodiment illustrated in FIG. 2, the LIDAR apparatus 202 comprises a controller 204, a first beam scanner 206 coupled to the controller 204, and a second beam scanner 208 coupled to the controller 204. In an embodiment, the first beam scanner 206 is configured to scan a laser beam in one or more of a first plurality of scan patterns, and the second beam scanner 208 is configured to scan a laser beam in one or more of a second plurality of scan patterns different from the first plurality of scan patterns for the first beam scanner 206.

In an embodiment, the controller 204 includes a processor 210, a memory 212, which may be coupled to the processor 210 or integral to the processor 210 on a single chip, a first beam scanner driver 214 coupled to the processor 210 and the memory 212, and a second beam scanner driver 216 coupled to the processor 210 and the memory 212. In an embodiment, the first beam scanner driver 214 in the controller 204 is coupled to the first beam scanner 206 and directs the laser beam transmitted by the first beam scanner 206 by issue steering commands to the first beam scanner 206.

In an embodiment, the second beam scanner driver 216 in the controller 204 is coupled to the second beam scanner 208 and directs the laser beam transmitted by the second beam scanner 208 by issuing commands to the second beam scanner 208 to point the laser beam in a given direction at a given time. Although the LIDAR apparatus in the embodiment shown in FIG. 2 illustrates the first beam scanner driver 214 and the second beam scanner driver 216 as separate blocks from the processor 210 and the memory 212, the beam scanner drivers 214 and 216 may be integral parts of the processor 210 and the memory 212 in another embodiment.

In the embodiment illustrated in FIG. 2, the first beam scanner 206 is configured to scan a wider area than the second beam scanner 208. In FIG. 2, the first beam scanner 206 is configured to scan the area 110 of the sector covered by angle $\alpha$, whereas the second beam scanner is configured to scan the area 112 of the sector covered by angle $\beta$. In an embodiment, the first beam scanner 206 may be configured to scan in a predetermined scan pattern covering a wide area. For example, the first beam scanner 206 may be programmed to scan in a line-by-line pattern, or a left-right-left-right pattern, or another pattern which allows the laser beam from the first beam scanner 206 to sweep across the area 110 of the sector covered by angle $\alpha$.

In an embodiment, the first beam scanner 206 may include a laser beam reflector which is movable or rotatable to sweep a reflected laser beam across the area 110. In an embodiment, the laser beam reflector may be a mechanically controlled reflector, for example, a microelectromechanical system (MEMS) controlled reflector, examples of which are known to persons skilled in the art. In alternate embodiments, other types of scanners that are capable of steering a laser beam to sweep across the area 110 may also be implemented as the first beam scanner 206 in FIG. 2. In an embodiment, the pattern of laser beam scanning by the first beam scanner 206 need not be fixed.

For example, the first beam scanner driver 214 in the controller 204 may issue steering commands to the first beam driver 206 according to different scan patterns based on various factors. For example, the angle $\alpha$ for the sector to be covered by the first beam scanner 206 may vary based on whether the road on which the vehicle is traveling is a wide highway or a narrow alley, or other factors that may have a bearing on how wide the angle $\alpha$ needs to be. Such factors may be derived from knowledge obtained from other sources, for example, from a navigation system coupled to the LIDAR apparatus 202 as shown in FIG. 2.

In an embodiment, the first beam scanner 206 covers one or more areas of interest in which one or more targets of interest are likely located. Such areas of interest may be relatively wide in some traffic environments, for example, on multi-lane highways or on roads at or near intersections. In an embodiment, it is not necessary for the first beam scanner 206 to be able to track precisely one or more specific targets in one or more areas of interest covered by the first beam scanner 206.

In an embodiment, the first beam scanner 206 only needs to obtain target data based on reflections of the laser beam from these targets and conveys the data to the processor 210 in the controller 204, which makes a determination as to which of these targets would be a target of interest. In collision avoidance applications, for example, a target of interest identified in one or more areas scanned by the first beam scanner 206 may be a target closest to the vehicle equipped with the LIDAR apparatus, a target which approaching at a high velocity, or a target which presents a great risk of collision. In an embodiment, more than one target of interest may be identified by the controller 204 for more precise monitoring or tracking.

In an embodiment, after the controller 204 determines which targets in the area 110 covered by the first beam scanner 206 need more precise monitoring or tracking, second beam scanner driver 216 in the controller 204 issues beam directing commands to the second beam scanner 208 to direct the laser beam transmitted by the second beam scanner to spots within the area 112 of the sector covered by angle $\beta$, as shown in FIG. 2. In an embodiment, the second beam scanner 208 comprises a beam scanner configured for foveation, that is, for directing the laser beam in random directions to random spots within the area 112, or alternatively, in preprogrammed directions that appear to be random. In an embodiment, the second beam scanner 208 comprises a diffraction-based beam scanner, for example, a liquid-crystal-on-silicon (LCOS) based beam scanner. In an embodiment, because the second beam scanner 208 only scans a relatively narrow sector defined by angle $\beta$, precise and frequent data updates on the targets of interest may be achieved even if the second beam scanner 208 has a relatively low switching rate.

It will be appreciated that, in the block diagram shown in FIG. 2, the first beam scanner 206 and the second beam scanner 208, which are parts of the LIDAR apparatus 202, may be physically located adjacent to each other. The blocks for the first beam scanner 206 and the second beam scanner 208 are shown as separate blocks in FIG. 2 for illustrating their respective functionalities. Referring to FIG. 1, which illustrates an exemplary traffic environment for the first vehicle 102 in which the LIDAR apparatus 202 of FIG. 2 is implemented, the area 112 of the narrower sector covered by angle $\beta$ is included within the area 110 of the wider sector covered by angle $\alpha$.

In an embodiment, the first beam scanner 206 in FIG. 2 is configured to scan a first laser beam, and a second beam scanner 208 is configured to scan a second laser beam. In alternate embodiments, one or more additional beam scanners may be implemented in the LIDAR apparatus to scan one or more additional areas of interest, for example, areas to the left, right or rear of the first vehicle 102 as shown in FIG. 1.

In an embodiment, the first beam scanner 206 and the second beam scanner 208 as shown in FIG. 2 may be configured to direct laser beams at the same wavelength. In this embodiment, a single laser source and a beam splitter may be provided in the LIDAR apparatus, and one of the split laser beams may be directed by the first beam scanner 206 for wide area scanning while the other split laser beam may be directed by the second beam scanner 208 for narrow area scanning.

In an alternate embodiment, the first and second beam scanners 206 and 208 may be configured to direct two laser beams at two different wavelengths. In this embodiment, additional information may be obtained by comparing the reflected signals from a given target of interest at different wavelengths, thereby allowing the LIDAR apparatus to perform further analysis of the target of interest. In a further embodiment, laser beams of different wavelengths may also be directed at other targets or objects in an area of coverage to obtain further knowledge of the targets or objects in the area, to obtain additional information that allows for further analysis of the environment in which the LIDAR apparatus is operating. For example, reflections of laser beams at different wavelengths may yield information on what types of vehicles are in the vicinity of the vehicle equipped with the LIDAR apparatus in a traffic environment.

Figure 3:
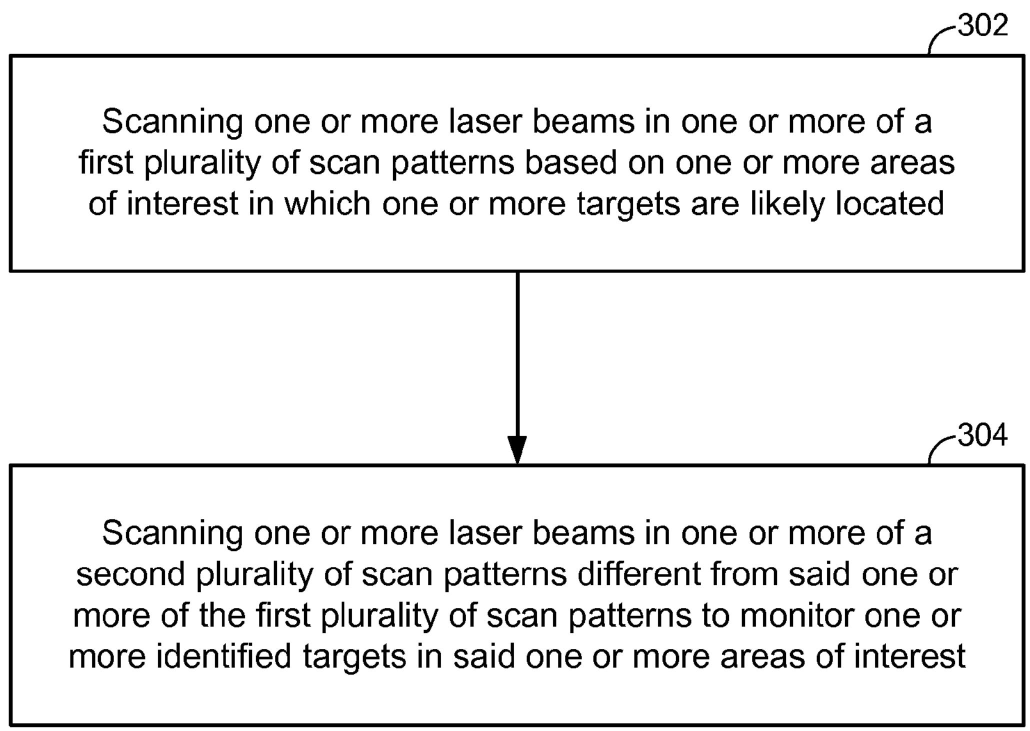
FIG. 3 is a flowchart illustrating an embodiment of a method of scanning one or more laser beams by a LIDAR apparatus.

FIG. 3 is a flowchart illustrating an embodiment of a method of scanning one or more laser beams by a LIDAR apparatus. In FIG. 3, the step of scanning one or more laser beams in one or more of a first plurality of scan patterns based on one or more areas of interest in which one or more targets are likely located is shown in block 302. The step of scanning one or more laser beams in one or more of a second plurality of scan patterns different from one or more of the first plurality of scan patterns to monitor one or more identified targets in one or more areas of interest is shown in block 304.

In an embodiment, the scanning of one or more laser beams in one or more of the first plurality of scan patterns as shown in block 302 of FIG. 3 is performed by the first beam scanner 206 as shown in FIG. 2. In an embodiment, the first beam scanner 206 may scan a relatively wide area or sector using a predetermined scan pattern. In an embodiment, the scanning of one or more laser beams as shown in block 302 of FIG. 3 may be performed by a laser beam reflector, for example, a mechanically controlled reflector such as a MEMS controlled reflector.

In an embodiment, the scanning of one or more laser beams in one or more of the second plurality of scan patterns as shown in block 304 of FIG. 3 is performed by the second beam scanner 208 as shown in FIG. 2. In an embodiment, the second beam scanner 208 may scan a relatively narrow area or sector compared to the area or sector scanned by the first beam scanner 206. In an embodiment, the scanning of one or more laser beams as shown in block 304 of FIG. 3 may be performed by a laser beam scanner configured for foveation, that is, for directing the laser beam in random directions to random spots, or alternatively, in preprogrammed directions that appear to be random. In an embodiment, the laser beam scanner that performs the scanning according to block 304 of FIG. 3 comprises a diffraction-based beam scanner, for example, a LCOS based beam scanner.

Figure 4:
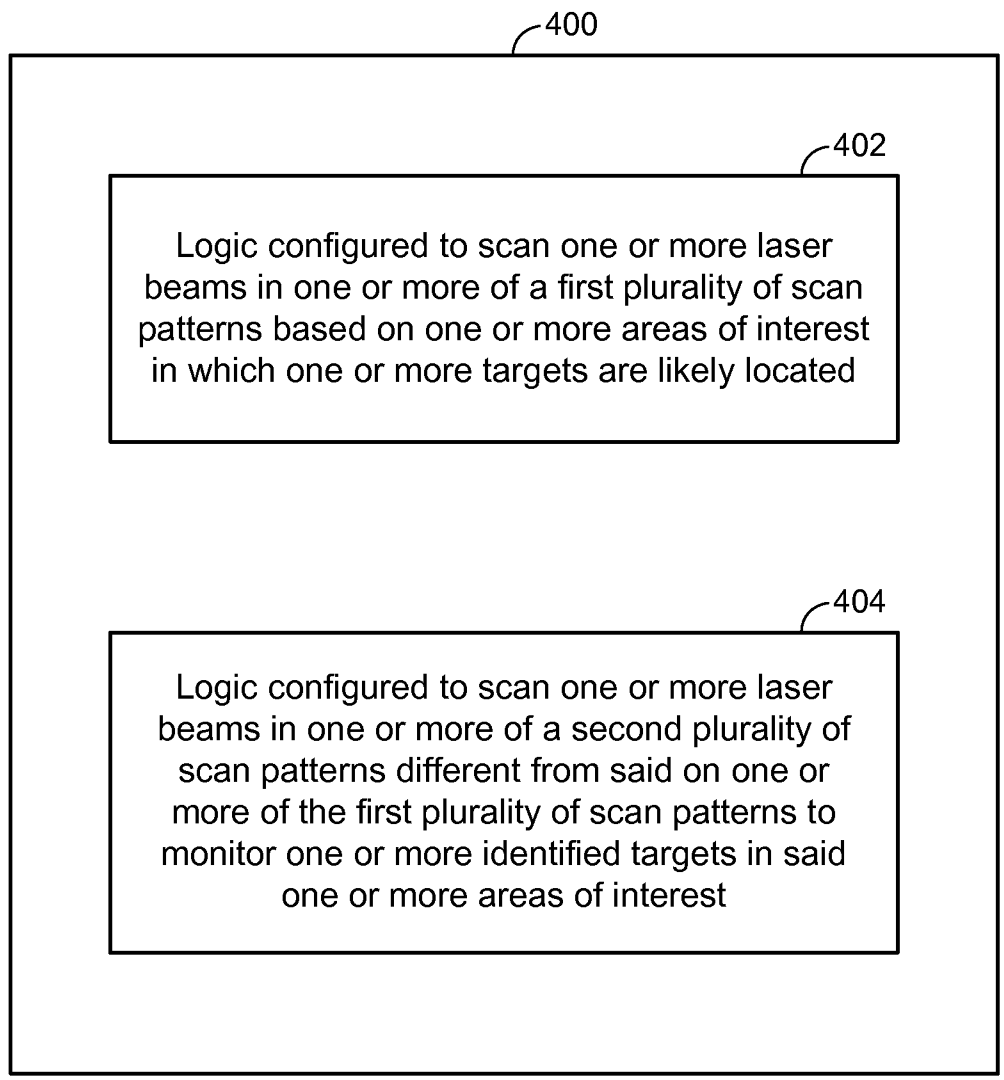
FIG. 4 is a block diagram illustrating an embodiment of logic configured to scan one or more laser beams by a LIDAR apparatus.

FIG. 4 is a block diagram illustrating an embodiment of an apparatus 400 for scanning one or more laser beams by a LIDAR apparatus. In FIG. 4, the apparatus 400 includes logic configured to scanning one or more laser beams in one or more of a first plurality of scan patterns based on one or more areas of interest in which one or more targets are likely located, as shown in block 402. The apparatus 400 also includes logic configured to scan one or more laser beams in one or more of a second plurality of scan patterns different from one or more of the first plurality of scan patterns to monitor one or more identified targets in one or more areas of interest is shown in block 404.

In an embodiment, the logic configured to scan one or more laser beams in one or more of the first plurality of scan patterns as shown in block 402 includes logic configured to scan one or more laser beams by a laser beam reflector, for example, a mechanically controlled reflector such as a MEMS controlled reflector. In an embodiment, the logic configured to scan one or more laser beams in one or more of the second plurality of scan patterns as shown in block 404 includes logic configured to scan one or more laser beams by a diffraction-based beam scanner, such as a LCOS based beam scanner.

In an embodiment, the logic configured to scan one or more laser beams in one or more of the first plurality of scan patterns as shown in block 402 and the logic configured to scan one or more laser beams in one or more of the second plurality of scan patterns as shown in block 404 may be implemented in the controller 204 as shown in FIG. 2. For example, the logic blocks 402 and 404 may be implemented in a hard-wired logic circuit in the processor 210, or alternatively, as a combination of hardware and software in the processor 210 and the memory 212.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware or a combination of hardware and software. Various illustrative components, blocks, modules, circuits, and steps have been described above generally in terms of their functionality. Whether such functionality is implemented as hardware or a combination of hardware and software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the embodiments disclosed herein may be embodied directly in hardware, or in a combination of hardware and a software module executed by a processor. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the disclosure can include a computer readable media embodying a method for cache way prediction using partial tags. Accordingly, the disclosure is not limited to illustrated examples and any means for performing the functionality described herein are included in embodiments of the disclosure.

While the foregoing disclosure shows illustrative embodiments, it should be noted that various changes and modifications could be made herein without departing from the scope of the appended claims. The functions, steps or actions of the method claims in accordance with embodiments described herein need not be performed in any particular order unless expressly stated otherwise. Furthermore, although elements may be described or claimed in the singular, the plural is contemplated unless limitation to the singular is explicitly stated.

What is claimed is:

1. A light detection and ranging (LIDAR) apparatus, comprising:
- a first beam scanner configured to
  - scan a first area using a first laser beam in one or more of a first plurality of scan patterns, and
  - obtain target data based on reflections of the first laser beam from one or more targets in the first area;
- a second beam scanner configured to scan a second area using a second laser beam in one or more of a second plurality of scan patterns different from said one or more of the first plurality of scan patterns, the first area being wider than the second area; and
- a controller coupled to the first beam scanner and the second beam scanner, the controller configured to
  - drive the first beam scanner to scan the first area to obtain the target data,
  - determine from the target data which of the one or more targets are targets of interest, and
  - drive the second beam scanner to spots within the second area to monitor the targets of interest determined from the target data.

2. The LIDAR apparatus of claim 1, wherein the first beam scanner comprises a laser beam reflector.

3. The LIDAR apparatus of claim 2, wherein the laser beam reflector comprises a mechanically controlled reflector.

4. The LIDAR apparatus of claim 2, wherein the laser beam reflector comprises a microelectromechanical system (MEMS) controlled reflector.

5. The LIDAR apparatus of claim 1, wherein the second beam scanner comprises a beam scanner configured for foveation.

6. The LIDAR apparatus of claim 1, wherein the second beam scanner comprises a diffraction-based beam scanner.

7. The LIDAR apparatus of claim 6, wherein the diffraction-based beam scanner comprises a liquid-crystal-on-silicon (LCOS) based beam scanner.

8. The LIDAR apparatus of claim 1, wherein the first and second laser beams have a same wavelength.

9. The LIDAR apparatus of claim 1, wherein the first and second laser beams have different wavelengths.

10. The LIDAR apparatus of claim 9, wherein the controller is further configured to distinguish targets of different materials based on reflections of the first laser beam and the second laser beam at different wavelengths.

11. The LIDAR apparatus of claim 1, wherein the second area is entirely within the first area.

12. A light detection and ranging (LIDAR) apparatus, comprising:

means for scanning a first area using a first laser beam in one or more of a first plurality of scan patterns, the means for scanning the first area obtaining target data based on reflections of the first laser beam from one or more targets in the first area;

means for scanning a second area using a second laser beam in one or more of a second plurality of scan patterns different from said one or more of the first plurality of scan patterns, the first area being wider than the second area; and means for controlling the means for scanning the first area and the means for scanning the second area, comprising:

means for driving the means for scanning the first area to scan the first area to obtain the target data;

means for determining from the target data which of the one or more targets are targets of interest; and means for driving the means for scanning the second area to spots within the second area to monitor the targets of interest determined from the target data.

13. The LIDAR apparatus of claim 12, wherein the means for scanning the first area scans at a faster rate than the means for scanning the second area.

14. The LIDAR apparatus of claim 12, wherein the means for scanning the first area comprises a laser beam reflector.

15. The LIDAR apparatus of claim 14, wherein the laser beam reflector comprises a mechanically controlled reflector.

16. The LIDAR apparatus of claim 14, wherein the laser beam reflector comprises a microelectromechanical system (MEMS) controlled reflector.

17. The LIDAR apparatus of claim 12, wherein the means for scanning the second area comprises a beam scanner configured for foveation.

18. The LIDAR apparatus of claim 12, wherein the means for scanning the second area comprises a diffraction-based beam scanner.

19. The LIDAR apparatus of claim 18, wherein the diffraction-based beam scanner comprises a liquid-crystal-on-silicon (LCOS) based beam scanner.

20. The LIDAR apparatus of claim 12, wherein the first and second laser beams have a same wavelength.

21. The LIDAR apparatus of claim 12, wherein the first and second laser beams have different wavelengths.

22. The LIDAR apparatus of claim 12, wherein the second area is entirely within the first area.

23. A method of scanning one or more laser beams, comprising:

scanning a first area using a first laser beam in one or more of a first plurality of scan patterns;

obtaining target data based on reflections of the first laser beam from one or more targets in the first area;

determining from the target data which of the one or more targets are targets of interest; and scanning a second area using a second laser beam in one or more of a second plurality of scan patterns different from said one or more of the first plurality of scan patterns to monitor the targets of interest determined from the target data, wherein first area is wider than the second area.

24. The method of claim 23, wherein scanning the first area is performed by a laser beam reflector, and wherein scanning the second area performed by a diffraction-based beam scanner.

25. The method of claim 23, wherein the first and second laser beams have the same wavelength.

26. The method of claim 23, wherein the first and second laser beams have different wavelengths.

27. The method of claim 23, wherein the second area is entirely within the first area.

28. An apparatus for scanning one or more laser beams, comprising:

logic configured to scan a first area using a first laser beam in one or more of a first plurality of scan patterns;

logic configured to obtain target data based on reflections of the first laser beam from one or more targets in the first area;

logic configured to determine from the target data which of the one or more targets are targets of interest; and logic configured to scan a second area using a second laser beam in one or more of a second plurality of scan patterns different from said one or more of the first plurality of scan patterns to monitor the targets of interest determined from the target data, wherein first area is wider than the second area.

29. The apparatus of claim 28, wherein the logic configured to scan the first area comprises logic configured to scan by a laser beam reflector, and wherein the logic configured to scan the second area comprises logic configured to scan by a diffraction-based beam scanner.

30. The apparatus of claim 28, wherein the second area is entirely within the first area.

* * * * *